United States Patent
Sawada

(10) Patent No.: US 6,186,384 B1
(45) Date of Patent: Feb. 13, 2001

(54) METHOD OF CLEAVING A BRITTLE MATERIAL USING A POINT HEAT SOURCE FOR PROVIDING A THERMAL STRESS

(75) Inventor: Hiroshi Sawada, Shiga (JP)

(73) Assignee: NEC Corporation, Tokyo (JP)

( * ) Notice: Under 35 U.S.C. 154(b), the term of this patent shall be extended for 0 days.

(21) Appl. No.: 09/260,139

(22) Filed: Mar. 1, 1999

(30) Foreign Application Priority Data

Feb. 27, 1998 (JP) .................................................. 10-047348

(51) Int. Cl.⁷ .................................................. B23K 26/00
(52) U.S. Cl. .......................................... 225/2; 219/121.61
(58) Field of Search ................. 225/2, 93.5; 219/121.61, 219/121.72, 121.85

(56) References Cited

U.S. PATENT DOCUMENTS

| | | | |
|---|---|---|---|
| 3,453,097 | * | 7/1969 | Hafner ................................. 225/93.5 |
| 3,790,744 | * | 2/1974 | Bowen ................................. 225/93.5 |
| 4,615,765 | * | 10/1986 | Levinson et al. .................... 219/121 |
| 5,084,604 | * | 1/1992 | Dekker et al. .................. 219/121.72 |
| 5,254,833 | * | 10/1993 | Okiyama .......................... 219/121.68 |
| 5,585,018 | * | 12/1996 | Kanaoka et al. ................. 219/121.72 |
| 5,776,220 | * | 6/1998 | Allaire et al. ............................. 225/2 |
| 5,939,010 | * | 8/1999 | Yuyama et al. ................. 219/121.61 |
| 5,968,382 | * | 10/1999 | Matsumoto et al. ................. 225/93.5 |
| 5,984,159 | * | 11/1999 | Ostendarp et al. ................. 225/93.5 |
| 5,998,759 | * | 12/1999 | Smart ............................. 219/121.69 |
| 6,023,039 | * | 2/2000 | Sawada ............................... 225/93.5 |

* cited by examiner

*Primary Examiner*—M. Rachuba
*Assistant Examiner*—Omar Flores-Sánchez
(74) *Attorney, Agent, or Firm*—Young & Thompson

(57) ABSTRACT

A method of determining optimum heating conditions for applying a pulse laser point heat source onto a strip of a brittle material at its position in the vicinity of a tip of a crack of the strip for cleaving the strip by a thermal stress, wherein at least one of a non-dimensional pulse time of the pulse laser point heat source, a non-dimensional distance of the pulse laser point heat source from the tip of the crack, and a non-dimensional heating area is decided so that a ratio of non-dimensional stress intensity factor to temperature takes just or approximately a maximum value.

20 Claims, 24 Drawing Sheets distribution of σ on a top edge distribution of $\sigma$ on a terminal distribution of $\sigma$ on X-axis (a) $D/W=0.3$ (b) D/W=0.5

(c) $D/W=1.0$

METHOD OF CLEAVING A BRITTLE MATERIAL USING A POINT HEAT SOURCE FOR PROVIDING A THERMAL STRESS

BACKGROUND OF THE INVENTION

The present invention relates to a method of cleaving a brittle material using a point heat source which is capable of providing a thermal stress to the brittle material.

As conventional methods of cutting a brittle material such as semiconductor wafers, ceramic wafers and glass substrates, a dicing method and a scribing method have generally been known. The dicing method is carried out by use of a diamond blade. The scribing method is carried out by forming a crack on a surface of the wafer and then applying a mechanical stress to the wafer to cut the wafer along the scribing lines.

The above conventional methods have disadvantages in cutting the material on which electric circuits are formed. The above conventional methods allow generation of micro-cracks or particles.

In order to solve the above problems with micro-cracks or particles, it was proposed to use a point heat source such as a laser beam for applying a thermal stress to the brittle material to cleave the same. This method is, for example, disclosed in Japanese laid-open patent publication No. 3-13040. This method will be described with reference to FIG. 1. A brittle material 21 is intended to be cleaved along a cleaving line 24. A recess 22 is first formed by use of a mechanical tool at a cleaving starting point which is defined as a crossing point of the cleaving line 24 and one side edge of the brittle material 21. A point heat source is used to locally apply a heat point 23 which is positioned on the cleaving line 24 and in the vicinity of the recess 22 so that a tensile stress is generated in a direction along tangential lines of virtual isothermal lines defined by the heat point 23. For this reason, the tensile stress causes a crack from the recess 22. The crack propagates from a tip of the recess 22 toward the point of the heat point 23. The tip of the crack propagates from the recess 22 toward the point of the heat source 23 so that the crack extends to a position which is close to but distanced from the point of the heat source 23. The crack, however, does not reach the point of the heat source 23 because no tensile stress appears on the point of the heat source 23. The point of the heat source 23 is moved to a point which is distanced from the tip of the crack and also which is positioned on a tangential line of the cleaving line 24 at the tip of the crack, so that the tip of the crack further propagates along the cleaving line 24. Namely, the heat source point 23 is positioned not just on the cleaving line but in the vicinity of the cleaving line 24.

In the above conventional cleaving method using the point heat source, heating conditions such as the position of the heat source 23 and the heating time have been found by trial-and-error method, wherein a distance between the tip of the crack and the point of the heat source 23 as well as a heating time should be varied to determine an optimum heating point and an optimum heating time for effectively and efficiently adding the thermal stress to the crack of the brittle material strip. The optimum heating point and the optimum heating time depend upon the material of the brittle strip and the width thereof. This means that the optimum distance between the tip of the crack and the point of the heat source 23 as well as the optimum heating time depend upon the material of the brittle strip and the width thereof, for which reason the optimum distance between the tip of the crack and the point of the heat source 23 as well as the optimum heating time are required to be found for every different materials of the brittle strip and the different widths thereof. Even if the distance between the tip of the crack and the point of the heat source as well as the heating time are required by the trial-and-error method, then those distance and heating time might be slightly different from the actual optimum distance and heating time. The conventional cleaving work is time-consuming procedure. This makes it difficult to realize automation of the laser beam machining.

In the above circumstances, it had been required to develop a novel method of cleaving a strip of brittle material free from the above problems.

SUMMARY OF THE INVENTION

Accordingly, it is an object of the present invention to provide a novel method of cleaving a strip of brittle material free from the above problems.

It is a further object of the present invention to provide a novel method of cleaving a strip of brittle material which is capable of automatically deciding optimum conditions, for example, position and time of a point heat source to be applied onto the brittle materiel to realize automation of a laser beam machining for various strips of brittle material which are different in width of the strip and materials.

It is a still further object of the present invention to provide a novel method of cleaving a strip of brittle material which enables to shorten the necessary time for finding the optimum distance between a tip of a crack and a point of a heat source as well as the optimum heating time for suppressing an ultimate maximum temperature to prevent any thermal influence to devices formed or the strip of brittle material.

The first aspect of the present invention provides a method of determining optimum heating conditions for applying a pulse laser point heat source onto a strip of a brittle material at its position in the vicinity of a tip of a crack of the strip for cleaving the strip by a thermal stress, wherein at least one of a non-dimensional pulse time of the pulse laser point heat source, a non-dimensional distance of the pulse laser point heat source from the tip of the crack, and a non-dimensional heating area is decided so that a ratio of non-dimensional stress intensity factor to temperature takes just or approximately a maximum value.

The second aspect of the present invention provides a method of cleaving a strip of a brittle material along a predetermined cleaving line by applying a pulse laser point heat source onto the strip of the brittle material to locally apply a thermal stress in the vicinity of a tip of a crack of the strip, wherein the pulse laser point heat source is applied under optimum heating conditions decided by deciding at least one of a non-dimensional pulse time of the pulse laser point heat source, a non-dimensional distance of the pulse laser point heat source from the tip of the crack, and a non-dimensional heating area so that a ratio of non-dimensional stress intensity factor to temperature takes just or approximately a maximum value.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
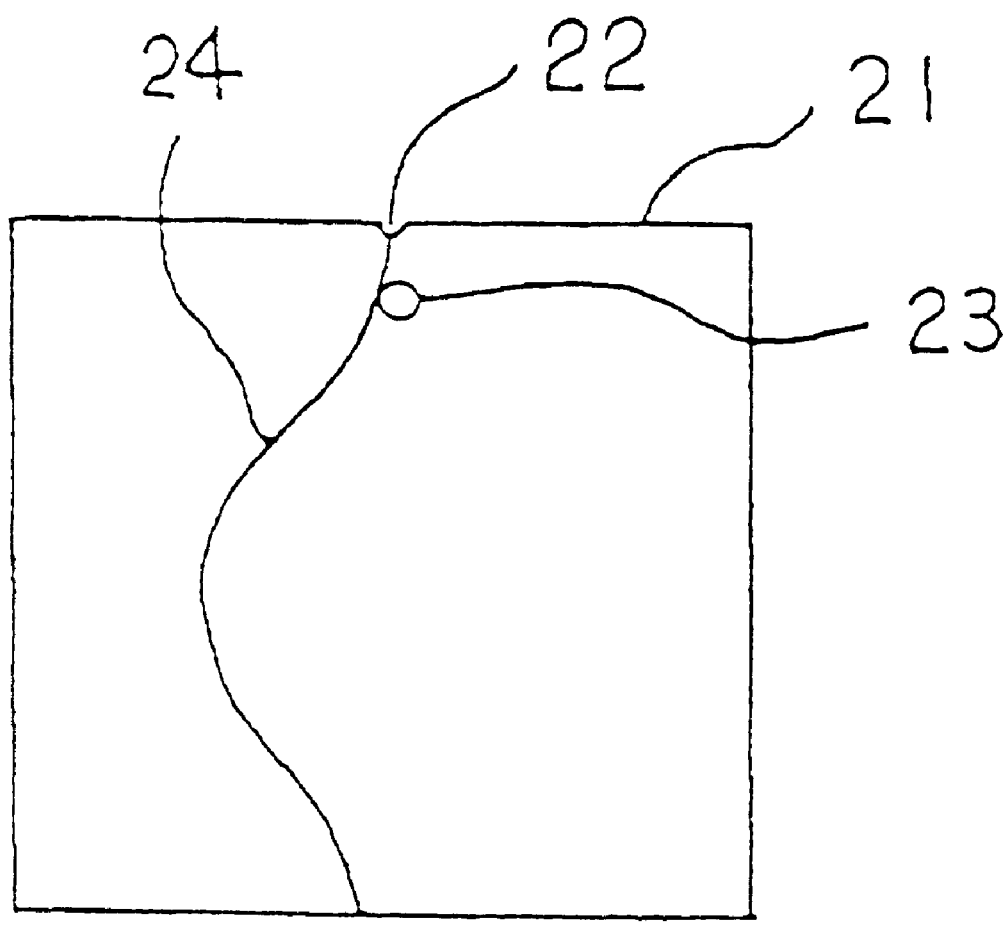
FIG. 1 is a view illustrative of a conventional method of cleaving a strip of a brittle material by use of a thermal stress caused by a point heat source such as a laser beam.

The first aspect of the present invention provides a method of determining optimum heating conditions for applying a pulse laser point heat source onto a strip of a brittle material at its position in the vicinity of a tip of a crack of the strip for cleaving the strip by a thermal stress, wherein at least one of a non-dimensional pulse time of the pulse laser point heat source, a non-dimensional distance of the pulse laser point heat source from the tip of the crack, and a non-dimensional heating area is decided so that a ratio of non-dimensional stress intensity factor to temperature takes just or approximately a maximum value.

It is preferable that the ratio of non-dimensional stress intensity factor to temperature is defined by $2K_1/\{\alpha ET\sqrt{(\pi W)}\}$, the non-dimensional pulse time is defined by $4\kappa t/W^2$, the non-dimensional distance is defined by D/W, and the non-dimensional heating area is defined by R/D, where $\alpha$ is a linear thermal expansion coefficient of the strip, "$\kappa$" is a thermal diffusivity of the strip, E is a modulus of longitudinal elasticity of t!he strip, T is an increased temperature of a heating point of the strip, t is a pulse time of the pulse laser point heat source, W is a width defined as a distance between a cleaving-intended line and a side edge of the strip, R is a radius of a beam spot of the pulse laser point heat source, D is a distance of a center position of the beam spot of the pulse laser point heat source from a tip of the crack of the strip.

It is further preferable that $4\kappa t/W^2 \leq 10$, and R/D $\geq 0.3$.

It is also preferable that the ratio of non-dimensional stress intensity factor to temperature is defined by $2K_1/\{\alpha ET\sqrt{(\pi W)}\}$, the non-dimensional pulse time is defined by $4\kappa t/W^2$, the non-dimensional distance is defined by D/W, and the non-dimensional heating area is defined by R/W, where $\alpha$ is a linear thermal expansion coefficient of the strip, "$\kappa$" is a thermal diffusivity of the strip, E is a modulus of longitudinal elasticity of the strip, T is an increased temperature of a heating point of the strip, t is a pulse time of the pulse laser point heat source, W is a width defined as a distance between a cleaving-intended line and a side edge of the strip, R is a radius of a beam spot of the pulse laser point heat source, D is a distance of a center position of the beam spot of the pulse laser point heat source from a tip of the crack of the strip.

It is further preferable that $4\kappa t/W^2 \leq 10$, and $0.3 \leq R/W \leq 1.0$.

The second aspect of the present invention provides a method of cleaving a strip of a brittle material along a predetermined cleaving line by applying a pulse laser point heat source onto the strip of the brittle material to locally apply a thermal stress in the vicinity of a tip of a crack of the strip, wherein the pulse laser point heat source is applied under optimum heating conditions decided by deciding at least one of a non-dimensional pulse time of the pulse laser point heat source, a non-dimensional distance of the pulse laser point heat source from the tip of the crack, and a non-dimensional heating area so that a ratio of non-dimensional stress intensity factor to temperature takes just or approximately a maximum value.

It is preferable that the ratio of non-dimensional stress intensity factor to temperature is defined by $2K_1/\{\alpha ET\sqrt{(\pi W)}\}$, the non-dimensional pulse time is defined by $4\kappa t/W^2$, the non-dimensional distance is defined by D/W, and the non-dimensional heating area is defined by R/D, where $\alpha$ is a linear thermal expansion coefficient of the strip, "$\kappa$" is a thermal diffusivity of the strip, E is a modulus of longitudinal elasticity of the strip, T is an increased temperature of a heating point of the strip, t is a pulse time of the pulse laser point heat source, W is a width defined as a distance between a cleaving-intended line and a side edge of the strip, R is a radius of a beam spot of the pulse laser point heat source, D is a distance of a center position of the beam spot of the pulse laser point heat source from a tip of the crack of the strip.

It is further preferable that $4\kappa t/W^2 \leq 10$, and R/D $\geq 0.3$.

It is also preferable that the ratio of non-dimensional stress intensity factor to temperature is defined by $2K_1/\{\alpha ET\sqrt{(\pi W)}\}$, the non-dimensional pulse time is defined by $4\kappa t/W^2$, the non-dimensional distance is defined by D/W, and the non-dimensional heating area is defined by R/W, where $\alpha$ is a linear thermal expansion coefficient of the strip, "$\kappa$" is a thermal diffusivity of the strip, E is a modulus of longitudinal elasticity of the strip, T is an increased temperature of a heating point of the strip, t is a pulse time of the pulse laser point heat source, W is a width defined as a distance between a cleaving-intended line and a side edge of the strip, R is a radius of a beam spot of the pulse laser point heat source, D is a distance of a center position of the beam spot of the pulse laser point heat source from a tip of the crack of the strip.

It is further preferable that $4\kappa t/W^2 \leq 10$, and $0.3 \leq R/W \leq 1.0$.

Since all of the parameters are non-dimensional, the above method is applicable independently from geometrical conditions of the strip, thermal and mechanical properties, for which reason the above method is applicable to various strips of the brittle material. The above method is capable of reducing the ultimate maximum temperature of the heat point to the necessary temperature for cleaving the stripe of the brittle material. This allows a reduction in the cost and increase in the quality of the device. In order to reduce the maximum temperature of the heating point for applying the necessary thermal stress onto the strip of the brittle material for cleaving the strip of the brittle material, it is effective to broaden the heating point so that the ultimate maximum temperature is suppressed and it is required to optimize the heating point area in size, position and shape. The above parameters are decided so that the above parameters, for example, the non-dimensional pulse time of the pulse laser point heat source, the non-dimensional distance of the pulse laser point heat source from the tip of the crack, and the non-dimensional heating area is decided so that a ratio of non-dimensional stress intensity factor to temperature takes just or approximately a maximum value. The optimum shape of the heating point area is just a circle. Available shapes are shapes which may be considered approximately or generally as a circle, for example, a slightly deformed circle, regular polygons such as square, regular pentagon, regular hexagon, regular octagon, and polygons slightly deformed from the regular polygons. The available brittle materials are semiconductors, ceramics and glasses.

Analysis of the novel cleaving methods will be described. First, there is made an analysis of a thermal stress filed when two points of the heat sources are symmetrically positioned with reference to a tangential line of a tip of a crack. Solutions of the above analysis are superimposed to evaluate an temperature increase at a center position of the heating area versus a heating time and a thermal intensity factor versus the heating time, so as to investigate variations in a ratio of thermal stress intensity factor to increased temperature versus a heating area whereby optimum size and position of the heating area for maximizing the ratio of thermal stress intensity factor to increased temperature are decided. It is further described that the results of the analysis well correspond to the experimental results using the electronic materials.

(1) Thermal Stress Intensity Factor in Two-Point Heating:
(1,1) thermoelastic field of a point heat source onto a infinite strip:

The description will be made for division of a semi-infinite strip using a continual point heat source. An axisymmetric temperature distribution $T^0(r, t)$ and resultant thermal stress fields $\sigma^0_r(r, t)$, $\sigma^0_\theta(r, t)$ due to a continual point heat source applied to a thin infinite elastic plate may be expressed as follows.

$$T^0(r, t) = \frac{Q}{4\pi\lambda} \int_0^t \frac{\exp\{-r^2/4\kappa(t-\tau)\}}{t-\tau} d\tau \quad (1)$$

-continued $$\sigma^0_r(r, t) = -\alpha E \frac{1}{r^2} \int_0^r T^0(r, t) r\, dr \quad (2)$$

$$\sigma^0_\theta(r, t) = -\alpha E T^0(r, t) + \alpha E \frac{1}{r^2} \int_0^r T^0(r, t) r\, dr \quad (3)$$

where r is a distance from the point heat source, t is a heating time, Q is a magnitude of the heat source per unit time and per unit thickness, $\lambda$ is a thermal conductivity, E is a modules of elasticity, $\kappa$ is a thermal diffusivity, $\alpha$ is a liner expansion coefficient. If the plate thickness is sufficiently thin, then the temperature in the direction of plate thickness may be regarded to be uniform so that the resultant thermal stress field would be in the ideal plane stress state. The upper and lower edges of the end of the strip are assumed to be thermally insulated. In order to obtain the temperature field of the strip, the above equation (1) may be superposed periodically.

(1,2) thermoelastic field by infinite periodic point source acting an infinite strip The thermoelastic field due to the infinitely periodic heat sources may be obtained simply by superposing the thermoelastic field due to the point heat source acting at ($\pm L$, $\pm 2nW$), (n=1,2, . . . ). The final expression for the field may be written in a certain coordinate system as follows.

$$T(x, y, t) = \frac{Q}{4\pi\lambda} \sum_{i=1}^{2} \sum_{j=1}^{2} \left\{ \sum_{n=-\infty}^{\infty} E_1\left(\frac{r_{i,j,n}^2}{4\kappa t}\right) \right\} \quad (4)$$

$$\sigma_x(x, y, t) = -\frac{\alpha E Q}{8\pi\lambda} \quad (5)$$

$$\sum_{i=1}^{2} \sum_{j=1}^{2} \left[ \sum_{n=-\infty}^{\infty} \left\{ E_1\left(\frac{r_{i,j,n}^2}{4\kappa t}\right) - \left(1 - e^{-\frac{r_{i,j,n}^2}{4\kappa t}}\right)\left(1 - 2\frac{X_1^2}{r_{i,j,n}^2}\right)\frac{4\kappa t}{r_{i,j,n}^2} \right\} \right]$$

$$\sigma_y(x, y, t) = -\frac{\alpha E Q}{8\pi\lambda} \quad (6)$$

$$\sum_{i=1}^{2} \sum_{j=1}^{2} \left[ \sum_{n=-\infty}^{\infty} \left\{ E_1\left(\frac{r_{i,j,n}^2}{4\kappa t}\right) + \left(1 - e^{-\frac{r_{i,j,n}^2}{4\kappa t}}\right)\left(1 - 2\frac{X_1^2}{r_{i,j,n}^2}\right)\frac{4\kappa t}{r_{i,j,n}^2} \right\} \right]$$

$$\tau_{xy}(x, y, t) = -\frac{\alpha E Q}{8\pi\lambda} \sum_{i=1}^{2} \sum_{j=1}^{2} \left[ \sum_{n=-\infty}^{\infty} \frac{8\kappa t X_i Y_{j,n}}{r_{i,j,n}^2}\left(1 - e^{-\frac{r_{i,j,n}^2}{4\kappa t}}\right) \right] \quad (7)$$

where $X_1=(x-L)$, $X_2=(x+L)$, $Y_n=y-2nW$, and $r2_{i,n}=X+Y$. E1(u) is the integral exponential function defined as $$E_1(u) = \int_u^\infty \frac{e^{-x}}{x} dx \quad (9)$$

It should be noted that the effect of heat dissipation from the plate surface was omitted simply because this analysis is concerned only with the thermoelastic phenomenon in the beginning of the heating, and a heating time t is restricted considerably short. For the large value of u, E1(u) is rapidly converged, for which reason the sum up to $\pm\infty$ about n can be approximated to be the sum up to some finite number N. It is assumed that the crack opening displacement induced by the infinite arrays of point heat source is considerably small and thus the temperature field remains unchanged even if the crack opens.

Figure 4:
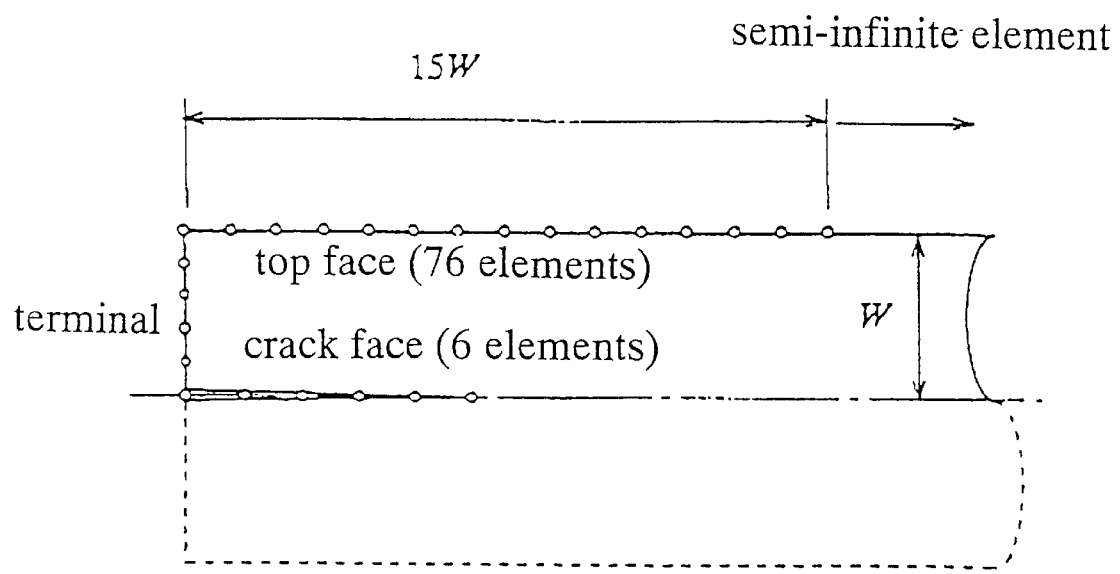
FIG. 4 is a view illustrative of a boundary element dividing method for analysis in valium force method to thermal stress filed provided by a point heat source.

(1,3) Analysis of equi-thermal stress field;
The thermal stress field due to the infinite arrays of heat source does not satisfy the stress boundary condition. In order to remove the stresses along the boundary, isothermal elastic field must be superposed. Stress intensity factor is calculated in the isothermal field whose stress boundary value is obtained from the condition that the traction along the boundary after superposition should be zero. In order to solve the isothermal problem, the body stress method for two dimensional elastic problem was used. The body stress method is one of the boundary type numerical technique for analysis of the stress, which was proposed by H. Nisitani. The body stress method seems to be the optimum numerical method for analysis of the crack. Moreover, highly accurate solution is easily obtainable. In the body stress method, the boundary of the body is approximated by several boundary elements in the same manner as in usual boundary element method. The boundary discretization for body stress method is shown in FIG. 4, where the linear element was used for the upper elements in the extents of 15 W and one semi-infinite boundary element for the remnant part.

Figure 2:
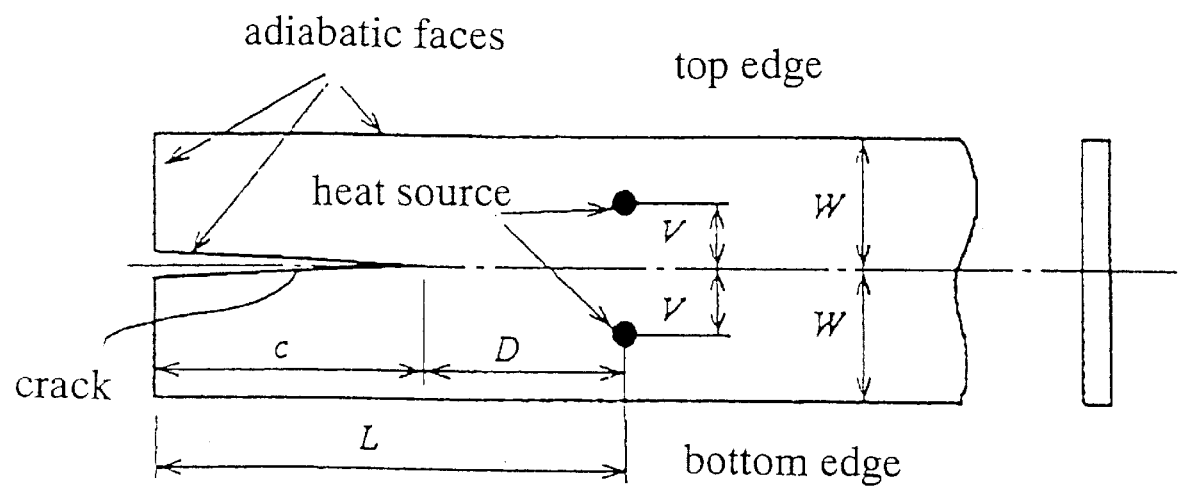
FIG. 2 is a view illustrative of a novel method of cleaving a semi-infinite strip of a brittle material by use of a thermal stress caused by a two-point heat.
Figure 3:
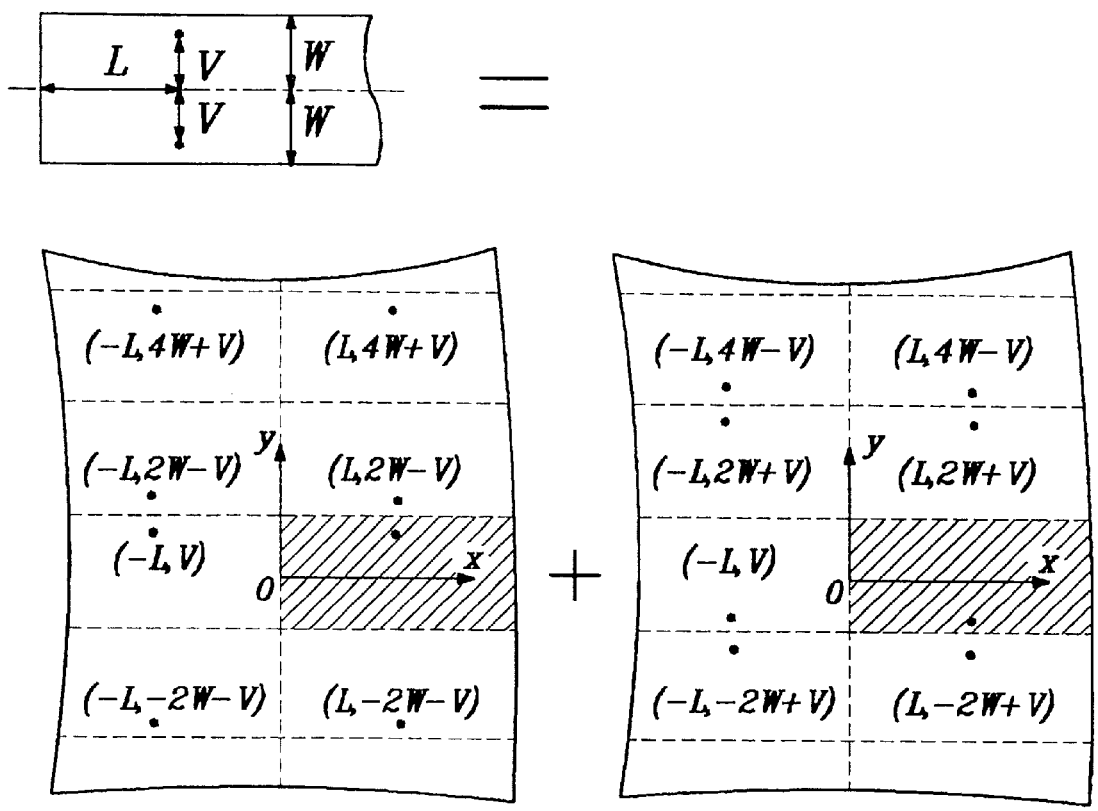
FIG. 3 is a view illustrative of a method of analysis to a non-stationary thermal field in the principle of superimposition.
Figure 5A:
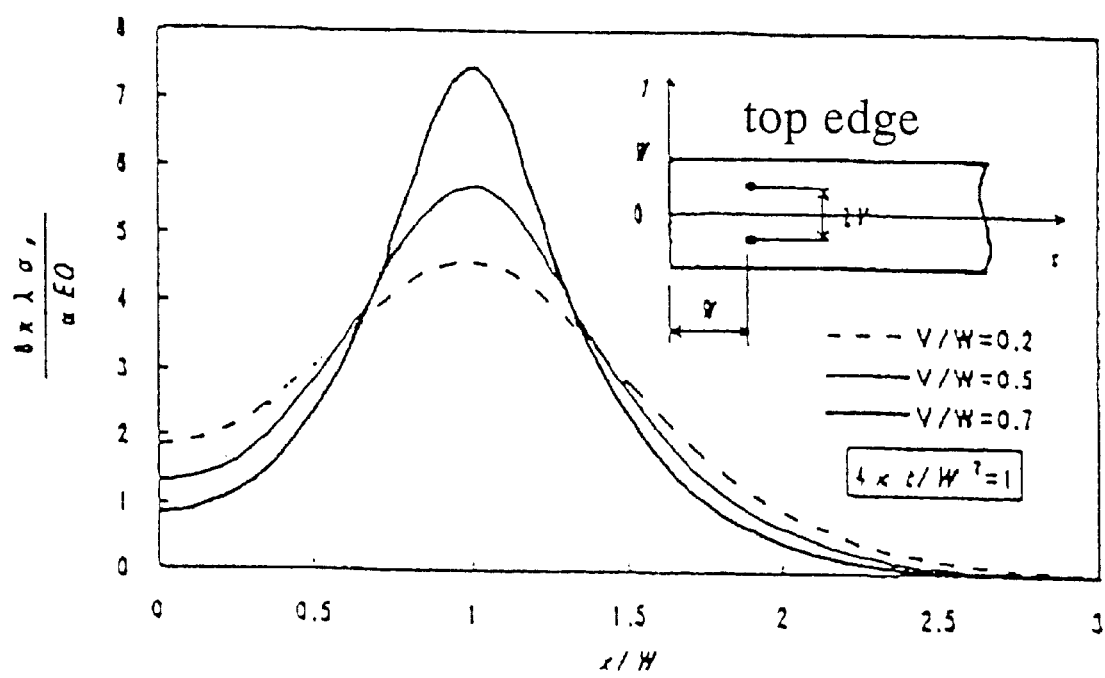
FIG. 5 is a view illustrative of distribution of surface stress of an equi-thermostress filed on boundaries to be superimposed onto the thermal stress field.
Figure 5B:
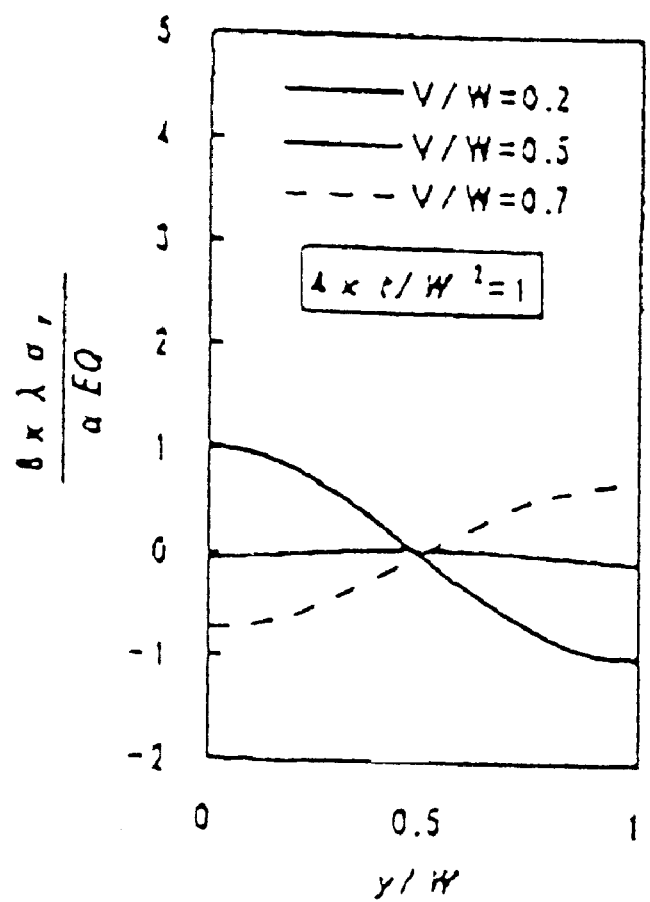
Figure 5C:
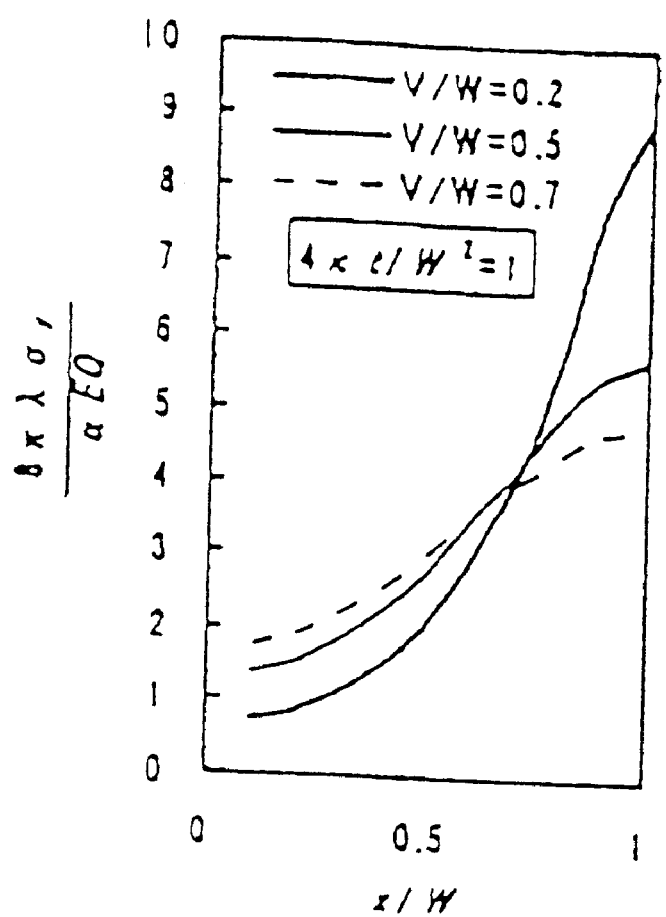

(1,4) surface stress along an edged surface:

In FIG. 2, a heating point position is assumed so that L=W so as to calculate distributions of surface stress to be superimposed at boundary verses various V/W values. The results of the calculation are shown in FIG. 5. The surface stress to be superimposed onto the top edged surface of the strip is tensile stress which cleave the crack. The stress $\sigma_y$ caused by the two-point heating on X-axis of the positions to be crack is compressive stress, a surface stress to be superimposed to have a crack face be free boundary is acted to close the crack which prevents the opening of the crack.

(1,5) thermal stress intensity factor:

If a crack length "c" becomes satisfying c/W>5, then the thermal stress intensity factor generated in the strip by the point heat source is almost independent from the crack length "c", for which reason the analysis is made to the stress applied to the strip with edge crack of c=5 W so as to evaluate the thermal stress intensity factor K1 as function of the heating time.

Figure 6:
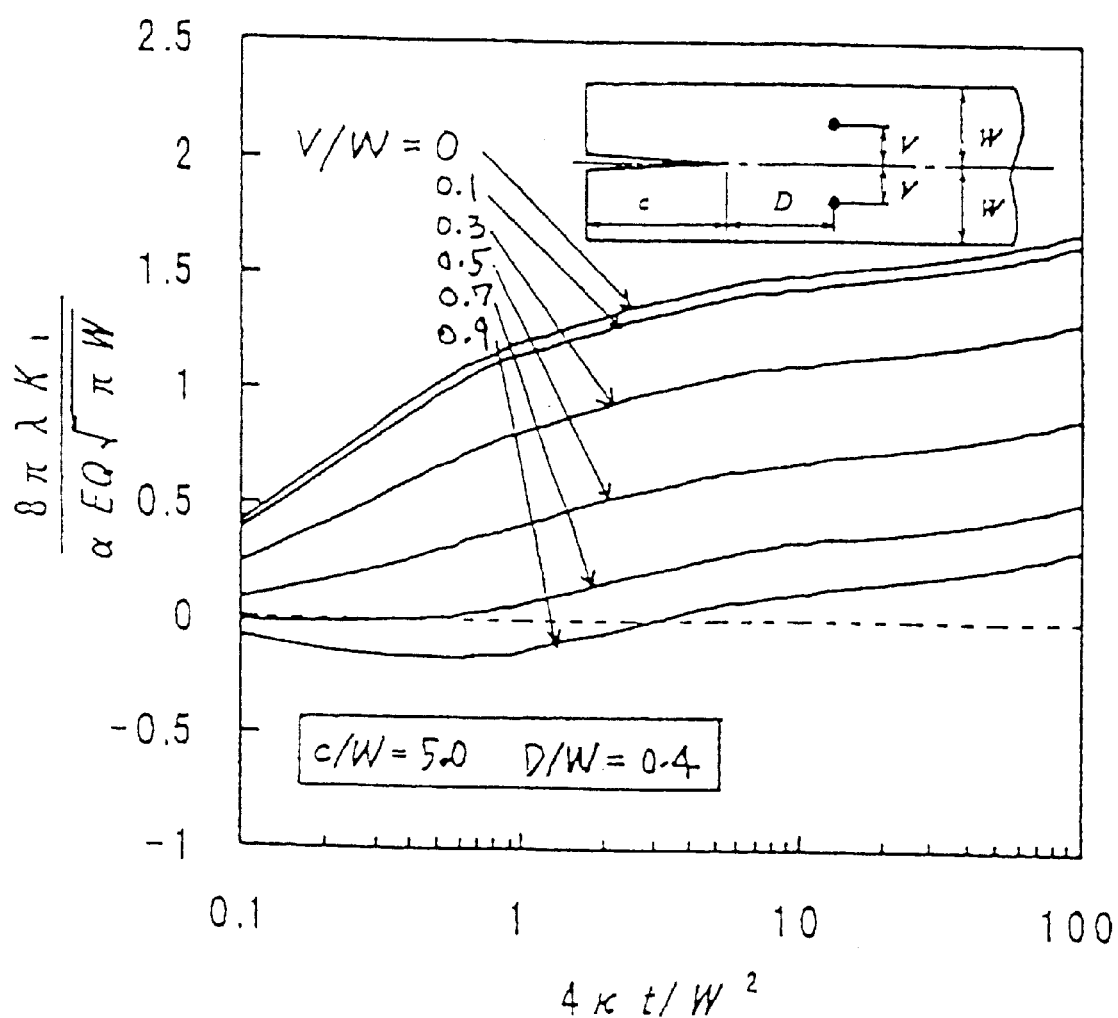
FIG. 6 illustrates variations in the thermal stress intensity factor K1 over times.

FIG. 6 illustrates variations in the thermal stress intensity factor K1 over times. As the heating point is closer to the center line, then the thermal stress intensity factor K1 is large. If V/W is over 0.7, then the thermal stress intensity factor K1 is minus in the initial period of heating.

Figure 7A:
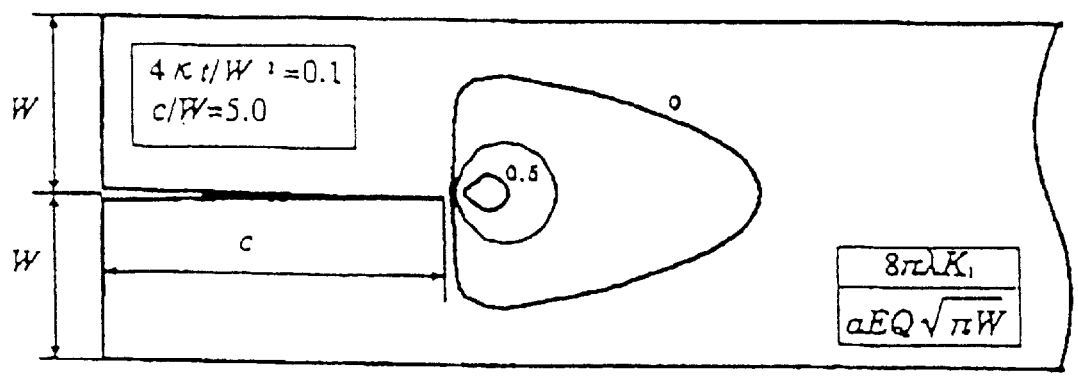
FIG. 7 illustrates equi-intensity lines, each of which connects heating positions providing the same thermal stress intensity factor K1.
Figure 7B:
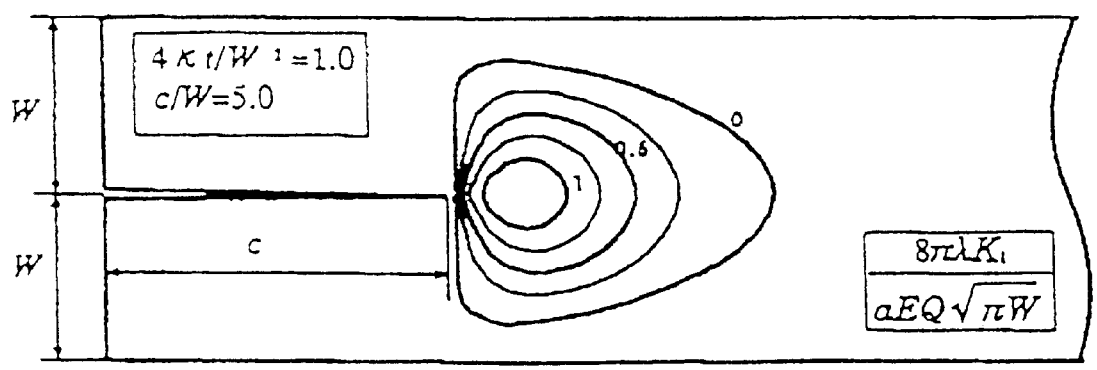
Figure 7C:
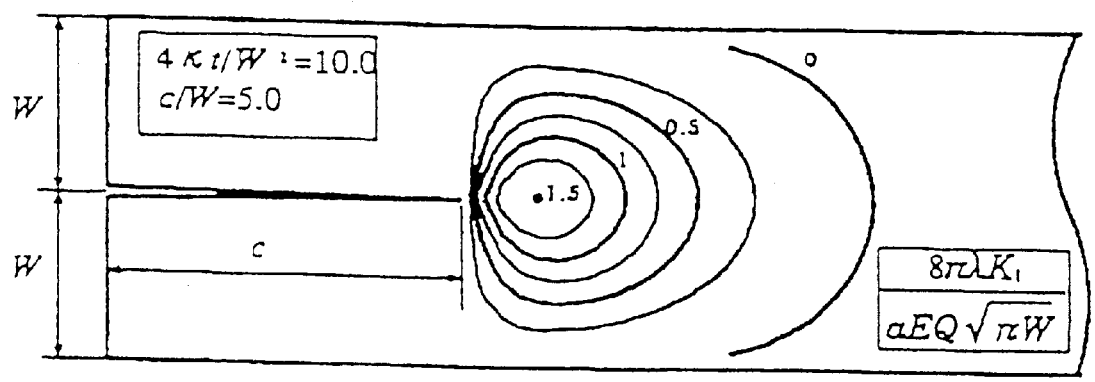

FIG. 7 illustrates equi-intensity lines, each of which connects heating positions providing the same thermal stress intensity factor K1. The equi-intensity line of K1=0 is generally shaped in triangle in the initial time period and becomes enlarged outwardly as the time is passed. If an outside region of the equi-intensity line of K1=0 is heated, then the tip of the crack has the negative value of the thermal stress intensity factor K1 thereby preventing the cleaving the crack. The equi-intensity line of K1=1 or higher is generally shaped in circle and is slightly distanced from the tip of the crack as the time is passed.

Figure 8:
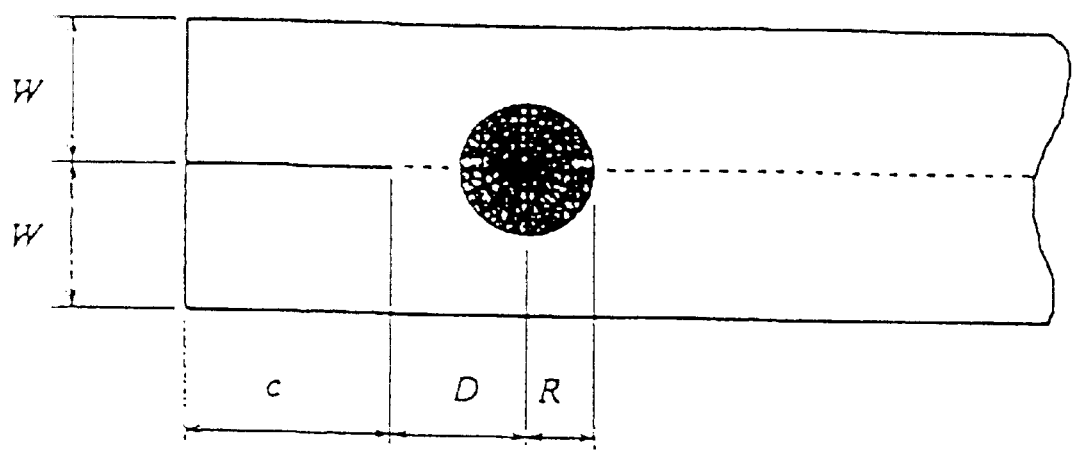
FIG. 8 is a view illustrative of cleaving the semi-infinite strip with a circle-shaped heating area.

(2) Thermal Stress Intensity Factor in Circular-Shaped Heating Area:

The analysis of the circular shaped heating area is made by utilizing the above results of the two-point heating. As illustrated in FIG. 8, the heating area or the pulse laser beam spot on the strip is a circle represented by a black color circle which has a center distanced by "D" from the tip of the crack and positioned on a cleave-intention line represented by a broken line as well as the circle has a radius "R". Q0 is the caloric per a unit area and a unit thickness. The heating area is divided into micro-areas $\Delta A = RdRdd\theta$ where $0 = /50$, and $dR = D/20$. The crack tip thermal stress intensity factor $\Delta K1$ and the temperature increase at a heating area center $\Delta T$ are evaluated assuming that a point heat source of $Q0\Delta A$ is positioned at a center of the micro-areas $\Delta A$, so that the total sum of the crack tip thermal stress intensity factor $\Delta K1$ and the temperature increase $\Delta T$ at a heating area center to find the thermal stress intensity factor K1 and the temperature T.

Figure 9:
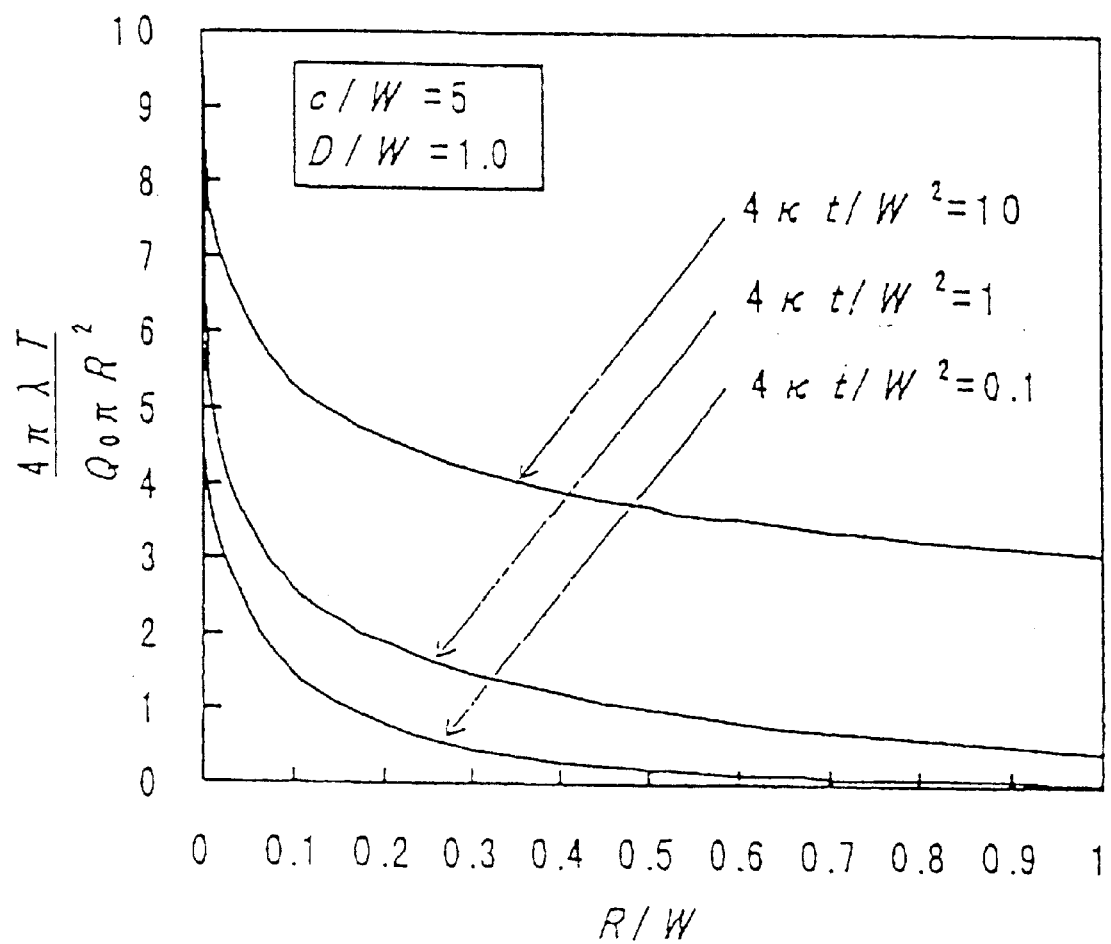
FIG. 9 illustrates the calculated temperature increase of the heat area center when c/W=5 and D/W=1.0.

FIG. 9 illustrates the calculated temperature increase of the heat area center when c/W=5 and D/W=1.0. The temperature increase is independent from the heating time and is decreased by increase in the radius of the heating area. It is effective to broaden the heat source for suppression of the temperature increase. The temperature is increased as a heating time becomes long.

Figure 10A:
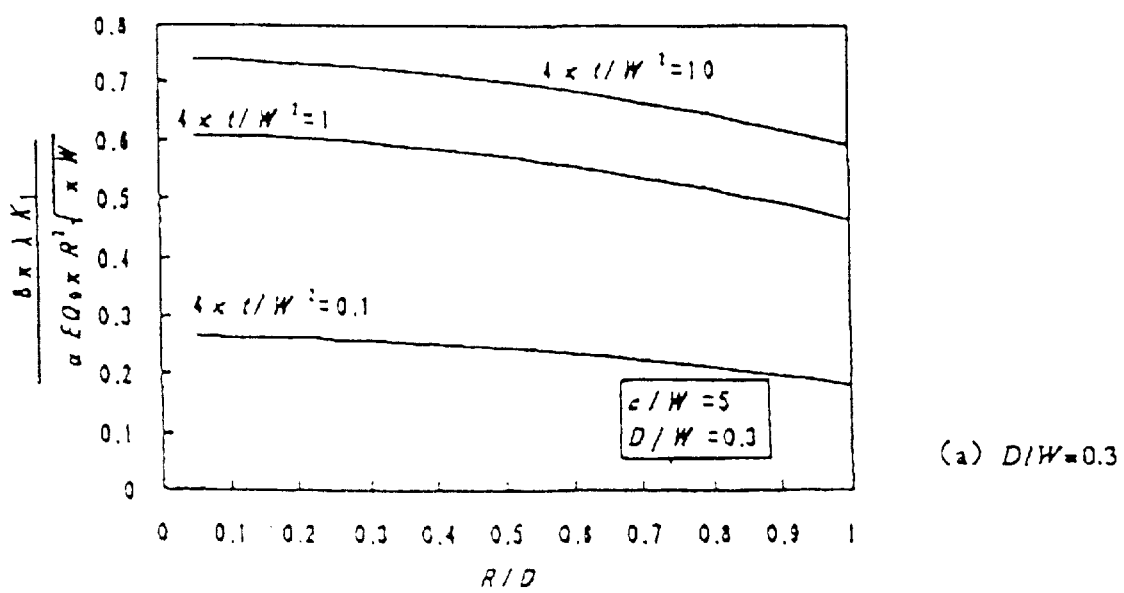
FIG. 10 illustrates variations in the thermal stress intensity factor K1 at D/W=0.3, 0.5, 1.0.
Figure 10B:
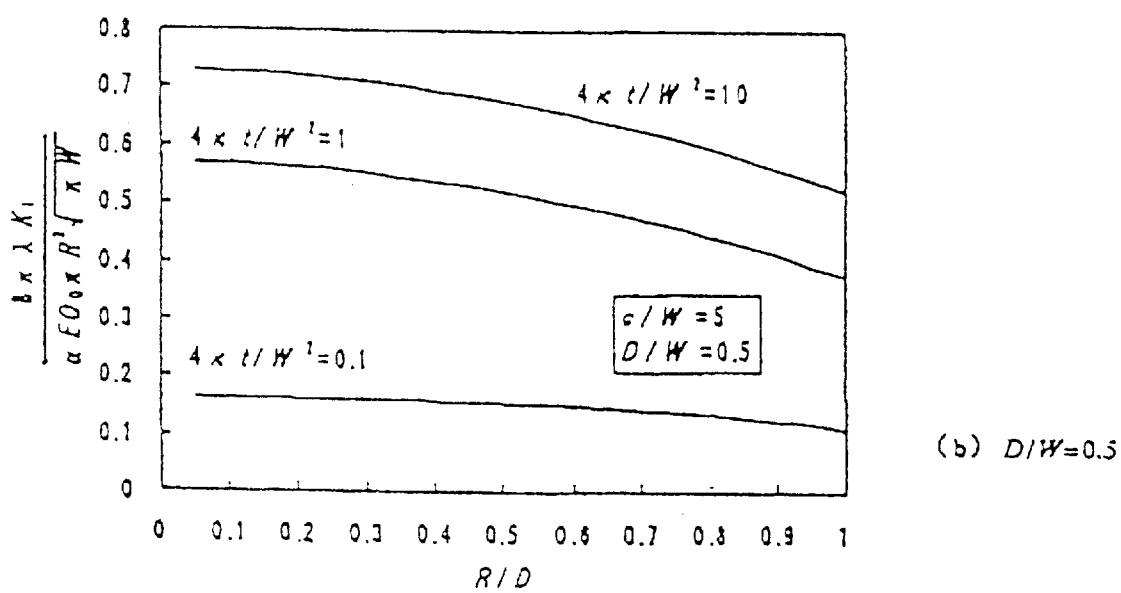
Figure 10C:
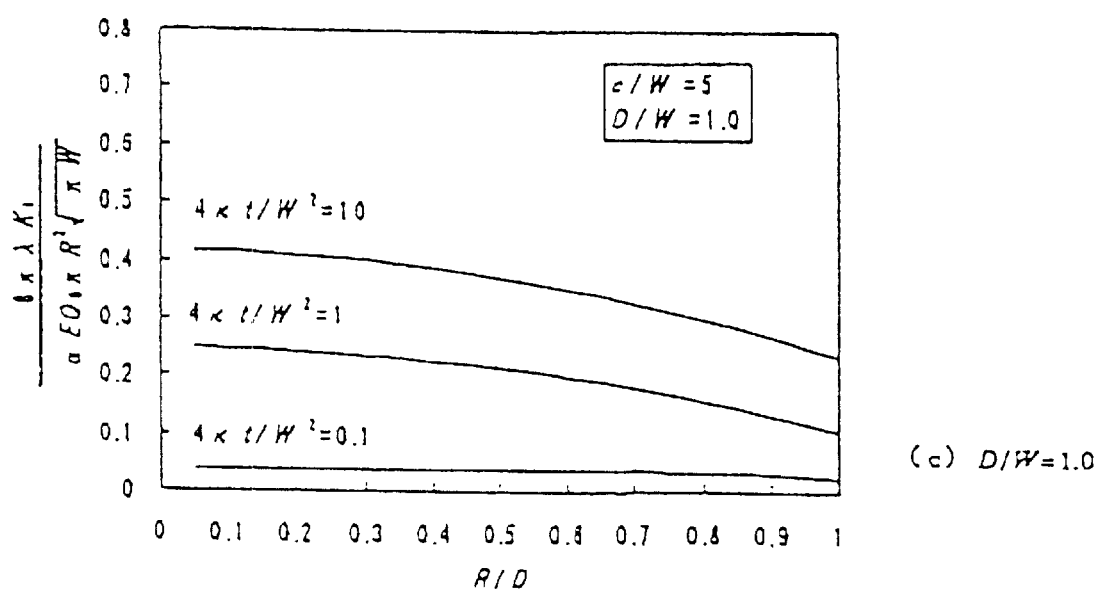

FIG. 10 illustrates variations in the thermal stress intensity factor K1 at D/W=0.3, 0.5, 1.0. The thermal stress intensity factor K1 takes a maximum value when R/D=0 or in case of the point heat source and is decreased by increasing R/D. This decrease becomes remarkable as the heating time is long. As the heating time is short, the decrease in the thermal stress intensity factor K1 by increasing the heating area is small. The thermal stress intensity factor K1 is increased independently from the heating center position and R/D.

(3) Ratio of Thermal Stress Intensity Factor to Temperature in Circle-shaped Heating Area:

The ratio of the thermal stress intensity factor to temperature in the circle-shaped heating area can be found on the basis of the calculated results of the temperature and the thermal stress intensity factor. As this ratio is large, it is possible to suppress the maximum temperature of the heat area center.

Figure 11A:
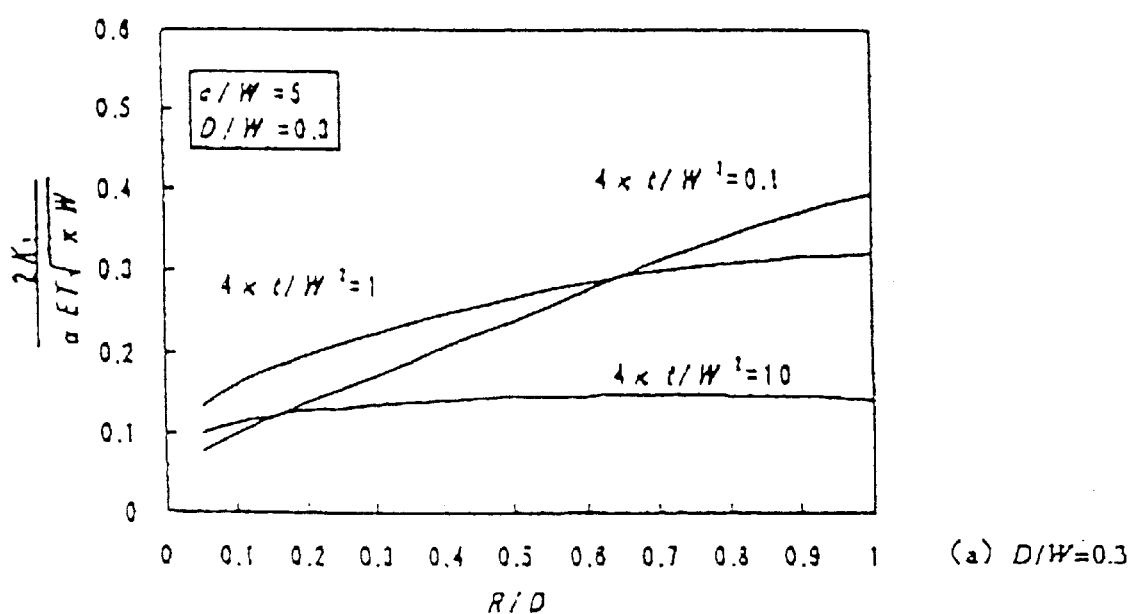
FIG. 11 illustrates variations in ratio of the thermal stress intensity factor to temperature in the circle-shaped heating area versus the radius R of the circle-shaped heating area at D/W=0.3, 0.5, and 1.0.
Figure 11B:
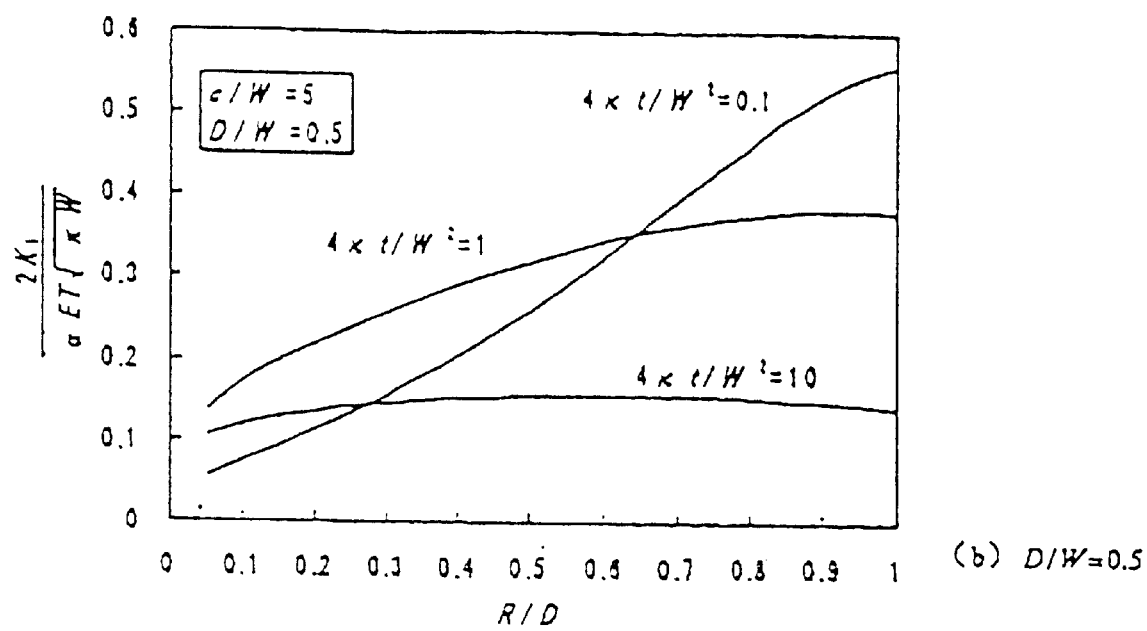
Figure 11C:
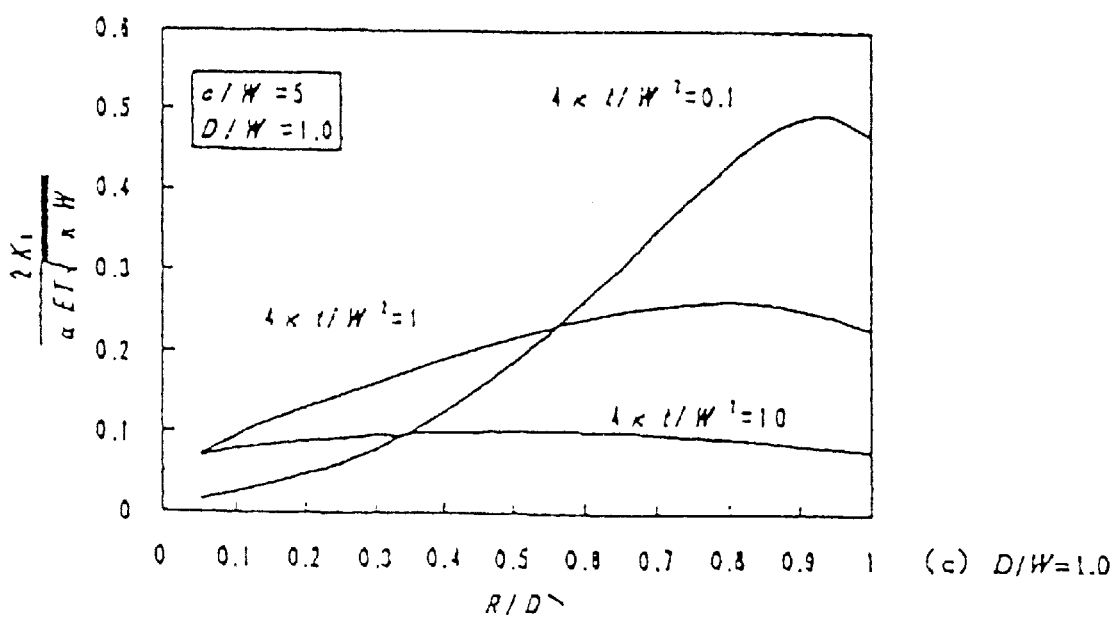

FIG. 11 illustrates variations in ratio of the thermal stress intensity factor to temperature in the circle-shaped heating area versus the radius R of the circle-shaped heating area at D/W=0.3, 0.5, and 1.0. When R/D=1, the ratio of the thermal stress intensity factor to temperature takes the maximum value or values closer thereto. If the width of the strip is narrow, the temperature increase is large.

Figure 12:
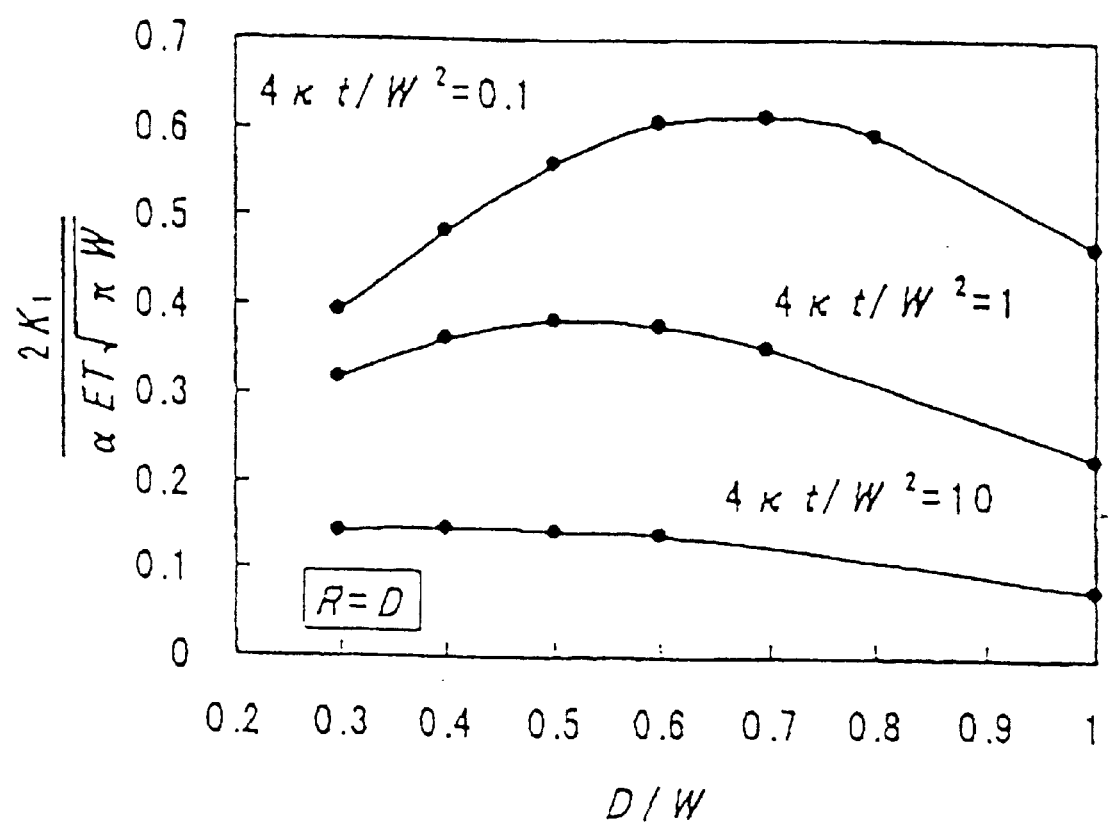
FIG. 12 illustrates variation in ratio of the thermal stress intensity factor to temperature versus D/W when R=D is satisfied so that the ratio of the thermal stress intensity factor to temperature takes maximum value or values closer thereto.

FIG. 12 illustrates variation in ratio of the thermal stress intensity factor to temperature versus D/W when R=D is satisfied so that the ratio of the thermal stress intensity factor to temperature takes maximum value or values closer thereto. If the timing tine is short, then the ratio of the thermal stress intensity factor to temperature is large. When the heating time $4\kappa t/W^2=0.1$, optimum heating area for suppressing the temperature increase and efficiently generating the thermal stress intensity factor is in the vicinity of R=D and D/W=0.7.

If the heating time $4\kappa t/W^2$ is increased, D/W for maximizing the ratio of the thermal stress intensity factor to temperature is decreased whereby the optimum heating position is made closer to the tip of the crack.

As described above, since all of the parameters are non-dimensional, the above method is applicable independently from geometrical conditions of the strip, thermal and mechanical properties, for which reason the above method is applicable to various strips of the brittle material. The above method is capable of reducing the ultimate maximum temperature of the heat point to the necessary temperature for cleaving the strip of the brittle material. This allows a reduction in the cost and increase in the quality of the device. In order to reduce the maximum temperature of the heating point for applying the necessary thermal stress onto the strip of the brittle material for cleaving the strip of the brittle material, it is effective to broaden the heating point so that the ultimate maximum temperature is suppressed and it is required to optimize the heating point area in size, position and shape. The above parameters are decided so that the above parameters, for example, the non-dimensional pulse time of the pulse laser point heat source, the non-dimensional distance of the pulse laser point heat source from the tip of the crack, and the non-dimensional heating area is decided so that a ratio of non-dimensional stress intensity factor to temperature takes just or approximately a maximum value. The optimum shape of the heating point area is just a circle. Available shapes are shapes which may be considered approximately or generally as a circle, for example, a slightly deformed circle, regular polygons such as square. regular pentagon, regular hexagon, regular octagon, and polygons slightly deformed from the regular polygons. The available brittle materials are semiconductors, ceramics and glasses.

In order to verify the above theoretical analysis, cleaving test of silicon strip using a Nd:YAG laser as the heat source was carried out.

Figure 13A:
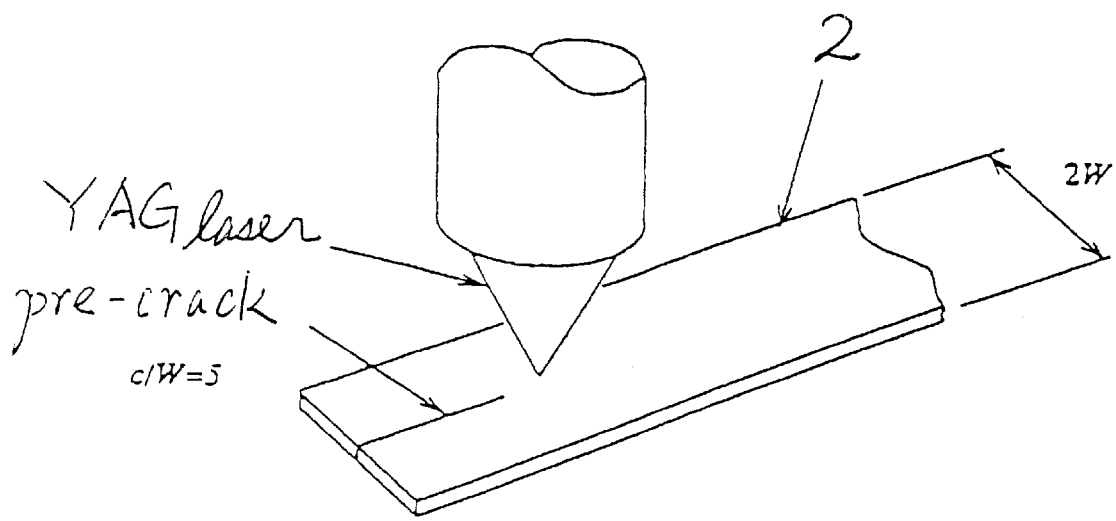
FIG. 13 is illustrative of a cleaving method of a strip of a brittle material by use of Nd:YAG laser.
Figure 13B:
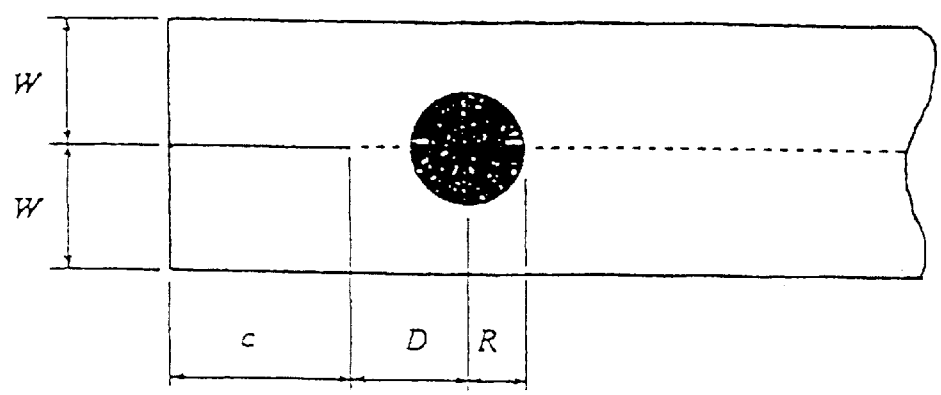

As illustrated in FIG. 13, a point heat source 1 is used to cleave a strip 2 of brittle material with a previous crack 3 on a longitudinal center line of the strip, wherein the strip has a width of 2 W and a length of the crack is "c" and a distance of the heating center from the tip of the crack is D, and a radius of the heating area is "R". The laser beam is adjusted in power by a diaphragm. Under various conditions, the laser power is gradually increased to measure the necessary power QL for cleaving the strip and the necessary power QU for providing a thermal damage to the strip without using the diaphragm. Sine it is difficult to measure locally the heating center during the cleaving process, QU/QL is set as a margin for measuring the variation in QU/QL over time so that if QU/QL is larger, the cleaving is caused at a lower temperature. A relationship between QU/QL and K1/T can be explained as follows.

If c/W and D/W ale constant, then K1/T is given the following $$\frac{K_1}{T} = f(R/D, 4\kappa t/W^2) \quad (10)$$

The equation (10) can be reformed to be the following equation.

$$T = \frac{K_1}{f(R/D, 4\kappa t/W^2)} \quad (11)$$

Since T and Q are proportional to each other, a relationship temperature increases TL and TU in case of QL and QU is given by the following equation.

$$\frac{Q_U}{Q_L} = \frac{T_U}{T_L} \quad (12)$$

In this case, TU corresponds to a melting point TM of the brittle material. K1 in case of TL corresponds to fracture toughness value K1C. From the above equations (10), (11), (12) the following equation can be introduced.

$$\frac{Q_U}{Q_L} = \frac{T_M}{K_{1C}} f(R/D, 4\kappa t/W^2) = const \cdot \frac{K_1}{T} \quad (13)$$

The variations in K1/T can be confirmed on the basis of QU/QL. The thickness of the strip is 0.1 millimeter and a previous crack length satisfies c/W=5.

The following Table 1 shows the thermo-mechanical properties of the used material.

TABLE 1

| $\kappa[m^2/s]$ | $\alpha[1/K]$ | $\lambda[W/mK]$ | $E[GPa]$ |
|---|---|---|---|
| $43.6 \times 10^{-6}$ | $4.56 \times 10^{-6}$ | 65 | 60.7 |

Figure 14:
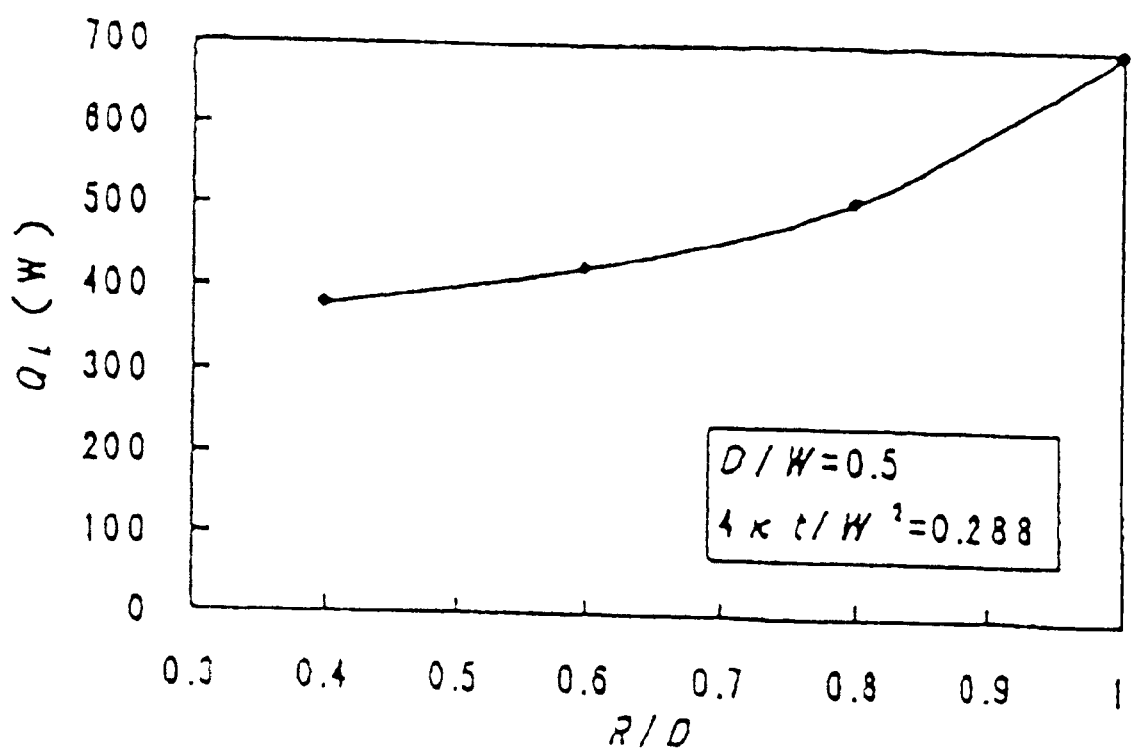
FIG. 14 illustrates variations in QL over heating area radius R when the strip has a width of 2.2 millimeters, and a length of 15 millimeters and D/W=0.5, and $4\kappa t/W^2$=0.288 and a heating time is 2 milliseconds.

Experimental results, will subsequently be described. FIG. 14 illustrates variations in QL over heating area radius R when the strip has a width of 2.2 millimeters, and a length of 15 millimeters and D/W=0.5, and $4\kappa t/W^2$=0.288 and a heating time is 2 milliseconds. The necessary calories for cleaving the strip is increased by increase the heating area radius R whereby the thermal stress intensity factor K1 is unlikely to be generated.

Figure 15:
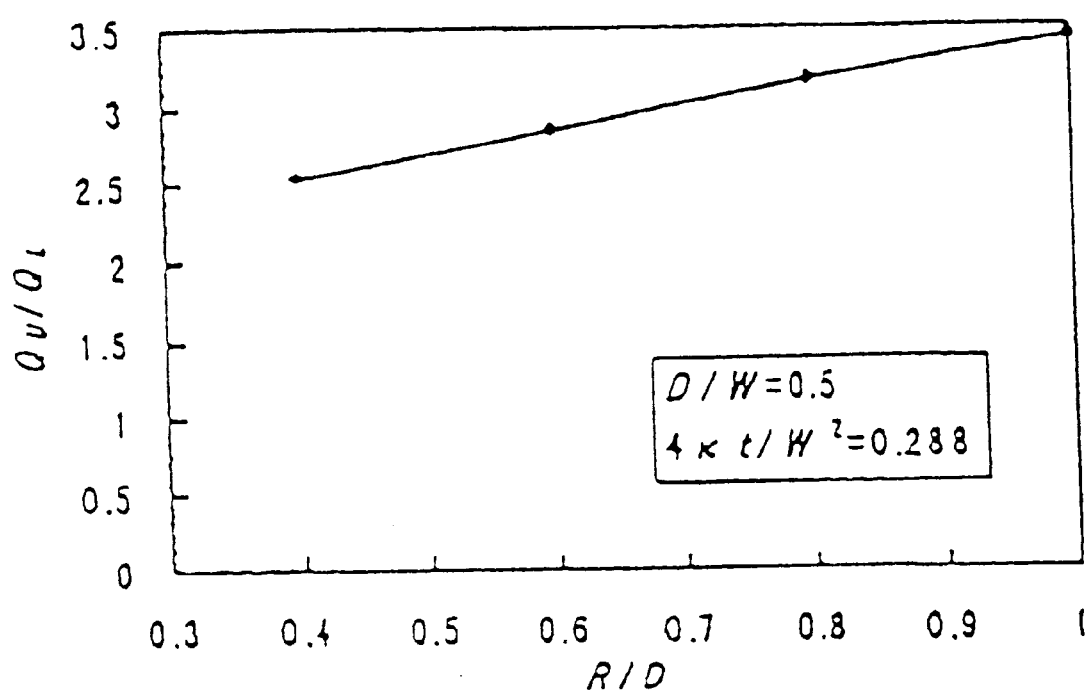
FIG. 15 illustrates variations in QU/QL over heating area radius R when the strip has a width of 2.2 millimeters, and a length of 15 millimeters and D/W=0.5, and $4\kappa t/W^2$=0.288 and a heating time is 2 milliseconds.

FIG. 15 illustrates variations in QU/QL over heating area radius R when the strip has a width of 2.2 millimeters, and a length of 15 millimeters and D/W=0.5, and $4\kappa t/W^2$=0.288 and a heating time is 2 milliseconds. If the heating area radius is increased, then the necessary power Qu for providing the thermal damage is also increased, for which reason QU/QL is increased by increase in R and the QU/QL is becomes maximum when R=D.

Figure 16:
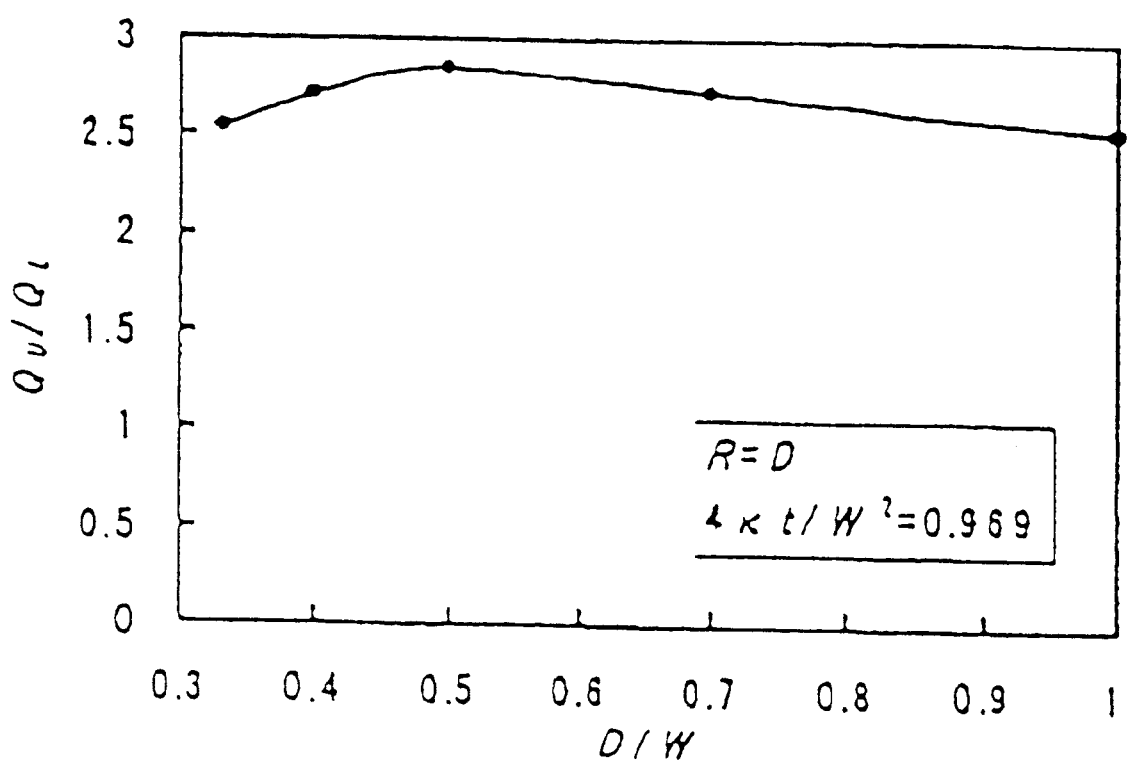
FIG. 16 illustrates variations in QU/QL over heating position D when R=D, the strip has a width of 1.2 millimeters, and a length of 10 millimeters and D/W=0.5, and $4\kappa t/W^2$=0.969 and a heating time is 2 milliseconds.

FIG. 16 illustrates variations in QU/QL over heating position D when R=D, the strip has a width of 1.2 millimeters, and a length of 10 millimeters and D/W=0.5, and $4\kappa t/W^2$=0.969 and a heating time is 2 milliseconds. In the vicinity of D/W=0.5, QU/QL takes a maximum value. This corresponds to the above results of the analysis when $4\kappa t/W^2$=1.0 shown in FIG. 12.

From the above theoretical analysis and experimental results, it could be understood that at least one of the non-dimensional pulse time of the pulse laser point heat source, the non-dimensional distance of the pulse laser point heat source from the tip of the crack, and the non-dimensional heating area is decided so that the ratio of non-dimensional stress intensity factor to temperature takes just or approximately a maximum value, wherein the ratio of non-dimensional stress intensity factor to temperature is defined by $2K_1/\{\alpha ET\sqrt{(\pi W)}\}$, the non-dimensional pulse time is defined by $4\kappa t/W^2$, the non-dimensional distance is defined by D/W, and the non-dimensional heating area is defined by R/D or R/W, where $\alpha$ is a linear thermal expansion coefficient of the strip, "$\kappa$" is a thermal diffusivity of the strip, E is a modulus of longitudinal elasticity of the strip, T is an increased temperature of a heating point of the strip, t is a pulse time of the pulse laser point heat source, W is a width defined as a distance between a cleaving-intended line and a side edge of the strip, R is a radius of a beam spot of the pulse laser point heat source, D is a distance of a center position of the beam spot of the pulse laser point heat source from a tip of the crack of the strip. The above parameters may preferably be decided with reference to FIGS. 11 and 12. It is preferable that $4\kappa t/W^2$ is as small as possible, and R/D is as closer to 1.0 as possible, for example, not less than 0.3. Optimum range of D/W is 0.3 to 1.0.

Since all of the parameters are non-dimensional, the above method is applicable independently from geometrical conditions of the strip, thermal and mechanical properties, for which reason the above method is applicable to various strips of the brittle material. The above method is capable of reducing the ultimate maximum temperature of the heat point to the necessary temperature for cleaving the stripe of the brittle material. This allows a reduction in the cost and increase in the quality of the device. In order to reduce the maximum temperature of the heating point for applying the necessary thermal stress onto the strip of the brittle material for cleaving the strip of the brittle material, it is effective to broaden the heating point so that the ultimate maximum temperature is suppressed and it is required to optimize the heating point area in size, position and shape. The above parameters are decided so that the above parameters, for example, the non-dimensional pulse time of the pulse laser point heat source, the non-dimensional distance of the pulse laser point heat source from the tip of the crack, and the non-dimensional heating area is decided so that a ratio of non-dimensional stress intensity factor to temperature takes just or approximately a maximum value. The optimum shape of the heating point area is just a circle. Available shapes are shapes which may be considered approximately or generally as a circle, for example, a slightly deformed circle, regular polygons such as square, regular pentagon, regular hexagon, regular octagon, and polygons slightly deformed from the regular polygons. The available brittle materials are semiconductors, ceramics and glasses.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of determining optimum heating conditions for applying a pulse laser point heat source onto a strip of a brittle material at its position in the vicinity of a tip of a crack of said strip for cleaving said strip by a thermal stress, the method comprising the step of:

selecting at least one heating condition from among a non-dimensional pulse time of said pulse laser point heat source, a non-dimensional distance of said pulse laser point heat source from said tip of said crack, and a non-dimensional heating area so that a ratio of non-dimensional stress intensity factor to temperature takes just or approximately a maximum value, wherein said ratio of non-dimensional stress intensity factor to temperature is defined by $2K_1/\{\alpha ET\sqrt{(\pi W)}\}$, said non-dimensional pulse time is defined by $4\kappa t/W^2$, said non-dimensional distance is defined by D/W, and said non-dimensional heating area is defined by R/D, where $\alpha$ is a linear thermal expansion coefficient of said strip, $\kappa$ is a thermal diffusivity of said strip, E is a modulus of longitudinal elasticity of said strip, T is an increased temperature of a heating point of said strip, t is a pulse time of said pulse laser point heat source, W is a width defined as a distance between a cleaving-intended line and a side edge of said strip, R is a radius of a beam spot of said pulse laser point heat source, and D is a distance of a center position of said beam spot of said pulse laser point heat source from a tip of said crack of said strip.

2. The method as claimed in claim 1, wherein $4\kappa t/W^2 \leq 10$, and $R/D \geq 0.3$.

3. The method of claim 1, wherein the selected heating condition is the non-dimensional pulse time of the pulse laser point heat source.

4. The method of claim 1, wherein the selected heating condition is the non-dimensional distance of the pulse laser point heat source from the tip of the crack.

5. The method of claim 1, wherein the selected heating condition is the non-dimensional heating area.

6. A method of determining optimum heating conditions for applying a pulse laser point heat source onto a strip of a brittle material at its position in the vicinity of a top of a crack of said strip for cleaving said strip by a thermal stress, the method comprising the step of:

selecting at least one heating condition from among a non-dimensional pulse time of said pulse laser point heat source, a non-dimensional distance of said pulse laser point heat source from said tip of said crack, and a non-dimensional heating area so that a ratio of non-dimensional stress intensity factor to temperature takes lust or approximately a maximum value, wherein said ratio of non-dimensional stress intensity factor to temperature is defined by $2K_1/\{\alpha ET\sqrt{(\pi W)}\}$, said non-dimensional pulse time is defined by $4\kappa t/W^2$, said non-dimensional distance is defined by D/W, and said non-dimensional heating area is defined by W/D, where $\alpha$ is a linear thermal expansion coefficient of said strip, $\kappa$ is a thermal diffusivity of said strip, E is a modulus of longitudinal elasticity of said strip, T is an increased temperature of a heating point of said strip, t is a pulse time of said pulse laser point heat source, W is a width defined as a distance between a cleaving-intended line and a side edge of said strip, R is a radius of a beam spot of said pulse laser point heat source, and D is a distance of a center position of said beam spot of said pulse laser point heat source from a tip of said crack of said strip.

7. The method as claimed in claim 6, wherein $4\kappa t/W^2 \leq 10$, and $0.3 \leq R/W \leq 1.0$.

8. The method of claim 6, wherein the selected heating condition is the non-dimensional pulse time of the pulse laser point heat source.

9. The method of claim 6, wherein the selected heating condition is the non-dimensional distance of the pulse laser point heat source from the tip of the crack.

10. The method of claim 6, wherein the selected heating condition is the non-dimensional heating area.

11. A method of cleaving a strip of a brittle material along a predetermined cleaving line by applying a pulse laser point heat source onto said strip of said brittle material to locally apply a thermal stress in the vicinity of a tip of a crack of said strip, the method comprising the steps of:

selecting at least one heating condition from among a non-dimensional pulse time of said pulse laser point heat source, a non-dimensional distance of said pulse laser point heat source from said tip of said crack, and a non-dimensional heating area so that a ratio of non-dimensional stress intensity factor to temperature takes just or approximately a maximum value, wherein said ratio of non-dimensional stress intensity factor to temperature is defined by $2K_1/\{\alpha ET\sqrt{(\pi W)}\}$, said non-dimensional pulse time is defined by $4\kappa t/W^2$, said non-dimensional distance is defined by D/W, and said non-dimensional heating area is defined by R/D. where $\alpha$ is a linear thermal expansion coefficient of said strip, $\kappa$ is a thermal diffusivity of said strip, E is a modulus of longitudinal elasticity of said strip, T is an increased temperature of a heating point of said strip, t is a pulse time of said pulse laser point heat source, W is a width defined as a distance between a cleaving-intended line and a side edge of said strip, R is a radius of a beam spot of said pulse laser point heat source, and D is a distance of a center position of said beam spot of said pulse laser point heat source from a tip of said crack of said strip; and cleaving the strip by applying the pulse laser point heat source onto said strip under the selected heating condition.

12. The method as claimed in claim 6, wherein $4\kappa t/W^2 \leq 10$, and $R/D \geq 0.3$.

13. The method of claim 11, wherein the selected heating condition is the non-dimensional pulse time of the pulse laser point heat source.

14. The method of claim 11, wherein the selected heating condition is the non-dimensional distance of the pulse laser point heat source from the tip of the crack.

15. The method of claim 11, wherein the selected heating condition is the non-dimensional heating area.

16. A method of cleaving a strip of a brittle material along a predetermined cleaving line by applying a pulse laser point heat source onto said strip of said brittle material to locally apply a thermal stress in the vicinity of a tip of a crack of said strip, the method comprising the steps of:

selecting at least one heating condition from among a non-dimensional pulse time of said pulse laser point heat source, a non-dimensional distance of said pulse laser point heat source form said tip of said crack, and a non-dimensional heating area so that a ratio of non-dimensional stress intensity factor to temperature takes just or approximately a maximum value, wherein said ratio of non-dimensional stress intensity factor to temperature is defined by $2K_1/\{\alpha ET\sqrt{(\pi W)}\}$, said non-dimensional pulse time is defined by $4\kappa t/W^2$, said non-dimensional distance is defined by D/W, and said non-dimensional heating area is defined by R/W, where $\alpha$ is a linear thermal expansion coefficient of said strip, $\kappa$ is a thermal diffusivity of said strip, E is a modulus of longitudinal elasticity of said strip, T is an increased temperature of a heating point of said strip, t is a pulse time of said pulse laser point heat source, W is a width defined as a distance between a cleaving-intended line and a side edge of said strip, R is a radius of a beam spot of said pulse laser point heat source, and D is a distance of a center position of said beam spot of said pulse laser point heat source from a tip of said crack of said strip; and cleaving the strip by applying the pulse laser point heat source onto said strip under the selected heating condition.

17. The method as claimed in claim 16, wherein $4\kappa t/W^2 \leq 10$, and $0.3 \leq R/W \leq 1.0$.

18. The method of claim 16, wherein the selected heating condition is the non-dimensional pulse time of the pulse laser point heat source.

19. The method of claim 16, wherein the selected heating condition is the non-dimensional distance of the pulse laser point heat source from the tip of the crack.

20. The method of claim 16, wherein the selected heating condition is the non-dimensional heating area.

* * * * *